June 13, 1933.    O. B. SCHOENKY ET AL    1,913,996
LOCOMOTIVE DRIVING JOURNAL BOX
Filed May 9, 1928    2 Sheets-Sheet 1
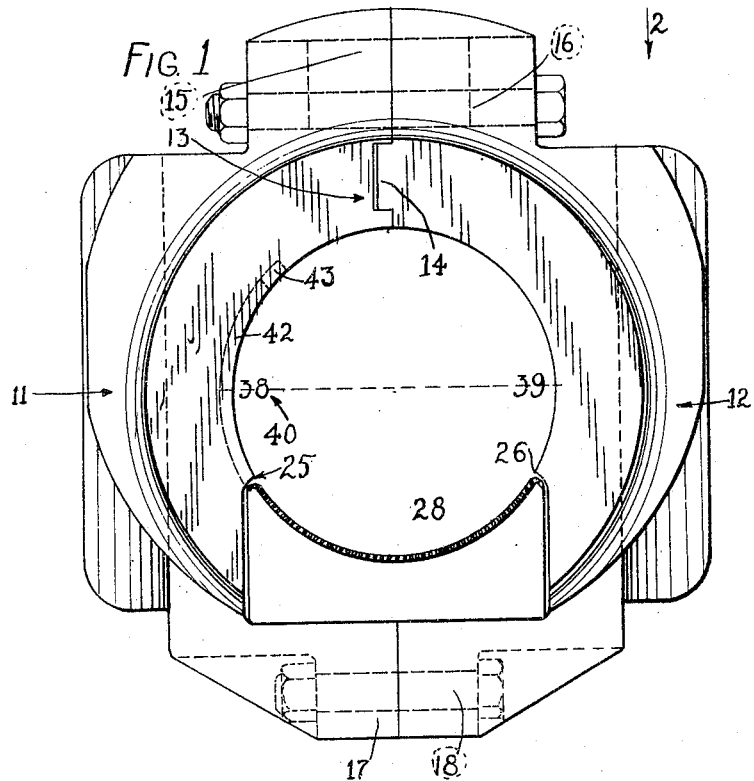
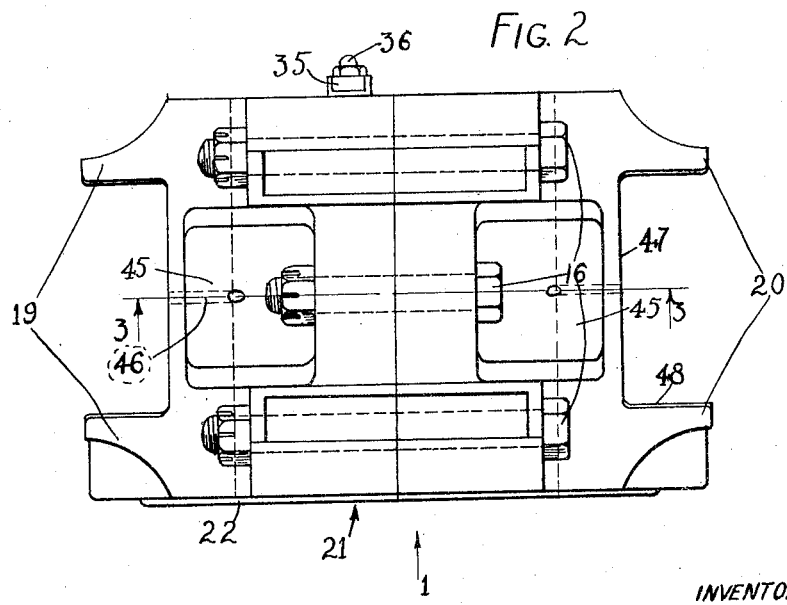
INVENTORS
O. B. SCHOENKY
R. U. LIPSCOMB
BY
ATTORNEYS

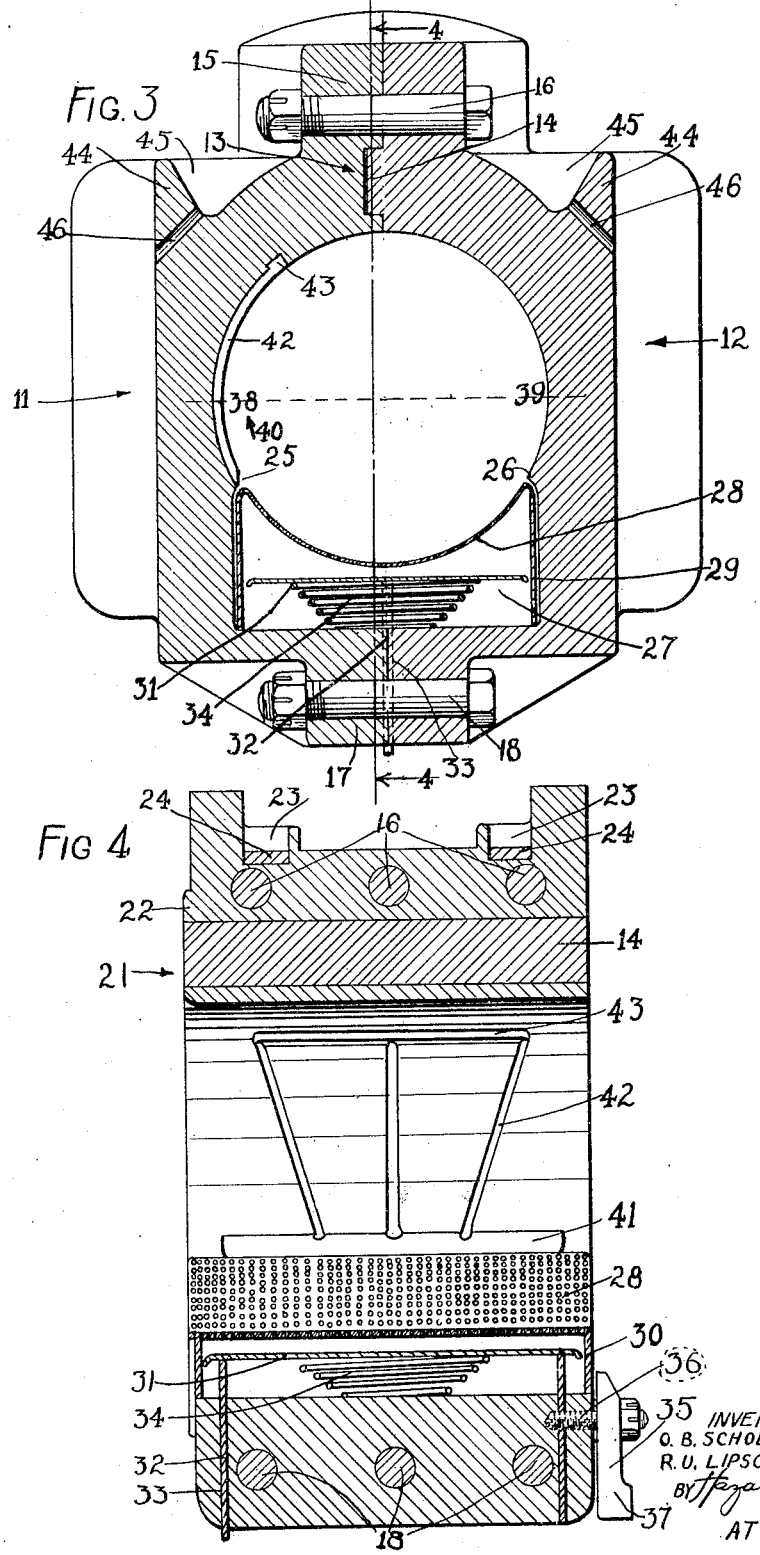

Patented June 13, 1933

1,913,996

UNITED STATES PATENT OFFICE

OTTO B. SCHOENKY, OF SOUTH PASADENA, CALIFORNIA, AND ROBERT U. LIPSCOMB, OF EL PASO, TEXAS

LOCOMOTIVE DRIVING JOURNAL BOX

Application filed May 9, 1928. Serial No. 276,475.

Our invention is a locomotive driving journal box.

An object of our invention is the construction of a locomotive driving journal box having a metal structure with the same characteristics throughout the whole journal box, the journal box preferably being constructed of solid brass formed in two half sections.

It has been found in locomotive journal boxes where the main supporting part of the structure is formed of one class of metal, such as iron, and the bearing portion constructed of a bearing type of metal, such as brass, that there is an unequal expansion and contraction due to changes of temperature. When the locomotive is running the bearing portion becomes very hot and where this is incased in an iron or similar metal structure there is an unequal expansion, and moreover the iron does not conduct the heat away from the bearing portion evenly or to a sufficient degree; therefore the structure of the journal box becomes distorted and in some cases broken.

Another objection to the driving journal boxes made of a supporting and a bearing metal arises in the difficulty of inserting or fitting of such bearing metal and maintaining proper bearing surfaces on the face of such metal.

Therefore, we form an improved type of locomotive journal box bearing using a bearing metal such as brass to form the whole structure except for the cellar used for lubricating and the bolts for securing the two halves of the bearing together.

A more detailed object of our invention therefore is the construction of a two-part solid metal journal having an overlap around the locomotive axle considerably greater than half of a circle, and having the parts interfitting to prevent any movement of the two parts of the journal box.

Another feature of our invention involves a simple manner of installing and retaining the grease cellar for the journal.

Our invention is illustrated in the accompanying drawings, in which:
Fig. 1 is a side elevation of the journal box taken in the direction of the arrow 1 of Fig. 2, Fig. 2 is a plan of the box taken in the direction of the arrow 2 of Fig. 1, Fig. 3 is a transverse section on the line 3—3 of Fig. 2 in the direction of the arrows.

Fig. 4 is a vertical longitudinal section of the journal on the line 4—4 of Fig. 3 in the direction of the arrows.

In constructing our invention we utilize two main body sections designated generally by the numerals 11 and 12. The section 11 is shown as having a transverse recess 13 in which fits a spline 14 on the section 12. The upper part of each section is provided with a heavy substantial lug 15 with clamping bolts 16 therethrough. The lower portion is also provided with substantial lugs 17 with clamping bolts 18 therethrough. Each section is also provided with guide flanges 19 and 20. The side 21 of the journal is the hub side and is provided with a slight extension 22 to accommodate the wear in use of the journal. There are a pair of recesses 23 in the top of the journal box having steel liners 24 fitted therein for the purpose of carrying the spring saddles.

The interior of the journal has a section between the points 25 and 26 which is concentric to the circle, and the points 25 and 26 are considerably below the horizontal diametrical line of the bore of the journal.

Below the journal section there is an enlarged cellar 27 to accommodate the driving box lubricator for holding the grease, this being illustrated as having a curved plate 28 with perforations, the curved plate having side walls 29 and end walls 30. There is also a pressure plate 31 having guide stems 32 extending downwardly and operating in guide slots 33 between the lugs 17. This plate is pressed upwardly by a compression spring 34.

The cellar construction is maintained in place by means of a swinging block 35 mounted on a bolt 36, this having a weighted end 37 to always hang downwardly. To illustrate the large bearing surface the line

38—39 indicates the horizontal diameter of the journal, the upper part therefore being a full semi-cylinder. In addition to this there is the bearing surface between the points 25 on one side and 38 and the point 36 on the other side and 39. These latter distances may be as great as substantially 30°. Therefore, the locomotive axle has a bearing which may be as great as 240° or more.

The lubrication system is somewhat as in the ordinary practice, the lubricating device being filled with grease and maintained in the cellar of the bearing. The grease is carried upwardly in the direction of the arrow 40, the axle in forward travel rotating in such direction; and thus the side 11 of the bearing is provided with a slight flat portion 41 from which extend grease ducts 42 following partly around the inside surface of the bearing, these terminating in a cross duct 43 running lengthwise of the bearing. This latter is shown about 30° above the vertical center point of the bearing.

Lips 44 are provided on the top of each of the journal sections. Forming behind these lips pockets 45 may be filled with a heavy lubricating oil, this oil passing through ducts 46 to lubricate the wear faces 47 on the sides of the journal box and the inside surfaces 48 of the flanges 19.

From the above description, together with the drawings, it will be seen that we have developed a locomotive driving journal box which may be considered in function as a solid bearing metal box, such as a solid brass box, and although this is formed in the two half sections these are bolted together sufficiently tight that the device functions as a one-piece bearing. The heat generated is thus radiated in all directions equally through the metal of the box and there is equal expansion and contraction. On account of the rigid bolting at the top and bottom of the box section there is no opportunity for any spreading to take place, particularly at the bottom as is occasioned in the usual types of open bottom locomotive boxes.

Therefore, in our type of journal box we eliminate the usual cast steel box which has a separate crown brass or other suitable bearing. Therefore, as above mentioned, we do not have to deal with unequal expansion ratios as in the case with the old type of bearing. We also increase the bearing surface below the horizontal center, which is an important feature in locomotive journal boxes. The feature of bolting the two halves of the box firmly together at the top and bottom facilitates the fitting of the bearing and the removal thereof as well as giving a substantial strong structure. The fact that the half sections have lugs at the bottom through which bottom bolts are passed, makes a stronger type of bearing than when a separate piece is fitted in the lower parts of an open bearing. There is therefore no tendency of our journal to close in or spread out in operation.

Another important feature of our invention is that the same brass casting which forms the journal box also forms the faces for the shoe and the wedges. In addition, we provide a large cellar in which may be located the lubricating device carrying a large amount of grease, and we provide efficient lubrication from this grease cellar to the journal and, in addition, the box provides grease pockets with ducts for lubricating the outside parts of the bearing.

Various changes may be made in the principles of our invention without departing from the spirit thereof, as set forth in the description, drawings and claims.

We claim:

1. A locomotive driving journal box having a pair of journal sections each with a partial bearing surface and with a joint line vertically above and below such surfaces with top and bottom lugs and bolts through the lugs securing the sections together, each section having wear surfaces on the outside adapted to receive the pedestals of a locomotive side frame and each section having a cut-out portion below the bearing surfaces adapted to form a grease cellar, the sections being formed of similar bearing metal and such metal of each section being integral and homogeneous throughout from the bearing surface to the extreme outside portions.

2. A locomotive driving journal box having a pair of journal sections each having a partial bearing surface on the inside upper portion, guide flanges and wear faces on the outside to receive the pedestal of a locomotive side frame, the sections having a vertical joint with upper and lower lugs and bolts securing the lugs together, the top having recesses with hard liners for spring saddles, the sections being formed of similar bearing metal and being integral and homogeneous throughout from the journal surface to the extreme outside portions, the bearing surface being adapted to contact the locomotive axle only at the sides and top.

3. A locomotive driving journal box having a pair of journal sections each with a partial journal section on the inside, having a vertical joint above and below the journal surface, one section having a transverse recess and the other a transverse spline fitting therein, top and bottom lugs with bolts therethrough, each of the sections having a cut-out portion below the journal surface to form a cellar with a lubricator fitted therein, each section having guide flanges with outside wear surfaces adapted to receive the pedestal of a locomotive side frame, the sections being formed of similar bearing metal and each section being integral and homogeneous throughout from the journal section on the inside to the extreme outer portion.

4. A locomotive driving journal box having a pair of journal sections each with a partial cylindrical journal surface on the inside and each having a cut-out section forming a cellar for a lubricator, the sections having a vertical joint above the journal section and below the cellar opening having upper and lower lugs with securing bolts therethrough, each section having vertical guide flanges with vertical wear surfaces to receive the pedestal of a locomotive side frame and each section having an oil pocket with a duct leading to the vertical wear surfaces, the sections being formed of the same bearing metal and each section being homogeneous and integral throughout from the journal surface to the extreme outer portions.

5. A locomotive driving journal box having a pair of journal sections each with a partly cylindrical bearing surface and each having a cut-out portion below the bearing surface forming a cellar, an oil lubricator in such cellar, means to secure the sections together above the journal surfaces and below the cellar, a swinging block pivotally connected below the said cellar and adapted to retain the lubricator in the cellar, each section having a vertical bearing surface on the outside to receive the pedestal of a locomotive side frame, the sections being formed of bearing metal each integral and homogeneous throughout.

6. A locomotive driving journal box having a pair of journal sections with vertical joints above and below the journal and being vertically disposed in regard to the axis of the journal, said sections having upper and lower lugs with bolts to secure the sections together, the lower inner portion of each section having a part cellar formed therein for insertion of a lubricator, each section having vertical guide flanges and provided with vertical wear faces for direct reception of the pedestals of a locomotive side frame, said sections being made of similar bearing metal and each section being integral and homogeneous throughout from the journal surface to the extreme outside portions.

7. A locomotive driving journal box as claimed in claim 6, each section having top recesses with metallic liners inserted therein for the reception of spring saddles.

8. A locomotive driving journal box as claimed in claim 6, each section having top recesses with metallic liners inserted therein for the reception of spring saddles, and in addition having pockets for lubricant with lubricant ducts leading therefrom to the vertical wear faces.

In testimony whereof we have signed our names to this specification.

O. B. SCHOENKY.
ROBERT U. LIPSCOMB.